United States Patent
Vetter et al.

(10) Patent No.: US 8,718,180 B2
(45) Date of Patent: May 6, 2014

(54) MULTI-ANTENNA WIRELESS COMMUNICATIONS METHOD AND APPARATUS WITH VECTOR PERTURBATION WITH A REDUCED LATTICE

(75) Inventors: Henning Vetter, Bristol (GB); Vishakan Ponnampalam, Bristol (GB)

(73) Assignee: Kabushiki Kaisha Toshiba, Tokyo (JP)

( * ) Notice: Subject to any disclaimer, the term of this patent is extended or adjusted under 35 U.S.C. 154(b) by 544 days.

(21) Appl. No.: 12/408,226

(22) Filed: Mar. 20, 2009

(65) Prior Publication Data

US 2009/0238304 A1 Sep. 24, 2009

(30) Foreign Application Priority Data

Mar. 20, 2008 (GB) ................................... 0805306.8

(51) Int. Cl.
- *H04L 27/00* (2006.01)
- *H04L 27/28* (2006.01)
- *H04K 1/10* (2006.01)
- *H04K 1/02* (2006.01)

(52) U.S. Cl.
USPC ........... 375/295; 375/260; 375/296; 375/285; 375/267

(58) Field of Classification Search
USPC ......... 375/295, 261, 296, 285, 340, 341, 267, 375/316
See application file for complete search history.

(56) References Cited

U.S. PATENT DOCUMENTS

2009/0175375 A1* 7/2009 Zhang ........................... 375/267
2009/0196379 A1* 8/2009 Gan et al. ...................... 375/340

OTHER PUBLICATIONS

Windpassinger, C.; Fischer, R.F.H.; Huber, J.B.; , "Lattice-reduction-aided broadcast precoding," Communications, IEEE Transactions on , vol. 52, No. 12, pp. 2057-2060, Dec. 2004 URL: http://ieeexplore.ieee.org/stamp/stamp.jsp?tp=&arnumber=1369614&isnumber=29976.*

Ponnampalam, V.; McNamara, D.; Lillie, A.; Sandell, M.; , "On Generating Soft Outputs for Lattice-Reduction-Aided MIMO Detection," Communications, 2007. ICC '07. IEEE International Conference on , vol., No., pp. 4144-4149, Jun. 24-28, 2007 URL: http://ieeexplore.ieee.org/stamp/stamp.jsp?tp=&arnumber=4289354&isnumber=4288671.*

Office Action issued May 17, 2011, in Japanese Patent Application No. 2009-069232 with English translation.

Christoph Windpassinger, et al. "Lattice-Reduction-Aided Broadcast Precoding", IEEE Transactions on Communications, vol. 52, No. 12, Dec. 2004, http://ieeexplorejeee.org/xpls/abs_all.jsp?arnumber=1369614, pp. 2057-2060.

Deric W. Waters, et al., "The Chase Family of Detection Algorithms for Multiple-Input Multiple-Output Channels", IEEE Transactions on Signal Precessing, vol. 56, No. 2, Feb. 2008, pp. 739-747.

Feng Liu, et al., "Low Complexity MMSE Vector Precoding Using Lattice Reduction for MIMO Systems", Proceedings of the 2007 IEEE International Conference on Communications (ICC 2007), Jun. 2007, pp. 2598-2603.

(Continued)

*Primary Examiner* — Shuwang Liu
*Assistant Examiner* — Ross Varndell
(74) *Attorney, Agent, or Firm* — Oblon, Spivak, McClelland, Maier & Neustadt, L.L.P.

(57) ABSTRACT

Precoding information prior to MIMO transmission is described, comprising determining a suitable preceding perturbation. The perturbation is determined by assembling a list of candidate perturbations in reduced lattice space, transforming these back into information lattice space and determining which candidate precoder perturbation is most suitable given a performance criterion.

13 Claims, 5 Drawing Sheets

(56) References Cited

OTHER PUBLICATIONS

Vishakan Ponnampalam, et al., "On Generating Soft Outputs for Lattice-Reduction-Aided MIMO Detection", Proceeding of the 2007 IEEE International Conference on Communications (ICC 2007), Jun. 2007, pp. 4144-4149.

Betrand M. Hochwald, et al., "A Vector-Perturbation Technique for Near-Capacity Multiantenna Multiuser Communication-Part II: Perturbation", IEEE Transactions on Communication, vol. 53, No. 3, Mar. 2005, pp. 537-544.

* cited by examiner

MULTI-ANTENNA WIRELESS COMMUNICATIONS METHOD AND APPARATUS WITH VECTOR PERTURBATION WITH A REDUCED LATTICE

CROSS REFERENCE TO RELATED APPLICATIONS

This application claims priority Under 35 U.S.C. §119 to UK Application No. 0805306.8 filed Mar. 20, 2008, the entire contents of which are incorporated by reference herein.

BACKGROUND OF THE INVENTION

1. Field of the Invention

The present invention is in the field of wireless communication and particularly, though not exclusively, the field of multiple input, multiple output (MIMO) communications.

2. Discussion of Background

In multiple-input multiple output (MIMO) systems employing precoding, channel knowledge is used at the transmitter in order to enhance link quality.

A conventional MIMO system, with $n_T$ transmit and $n_R \leq n_T$ receive antennas, can be modelled mathematically in the complex baseband notation as:

$$y = Hx + n \tag{1}$$

where H is the $n_R \times n_T$ channel matrix, x the $n_T \times 1$ transmit vector of complex symbols with transmit power constraint $\|x\|^2 = 1$, y the $n_R \times 1$ receive vector, and n is an $n_R \times 1$ zero-mean white Gaussian distributed noise vector with variance $\sigma_n^2$.

Precoding can be also employed in OFDM systems. In such a system, it can be applied, for example, for each sub-carrier separately or for a group of subcarriers.

Precoding can be achieved in several ways. For example, the Moore-Penrose pseudoinverse $P = H^+$ can be applied at the transmitter side, which, in one network configuration, can be at a base station. If $n_T = n_R$, P becomes simply $P = H^{-1}$. This precoding step is necessary for instance in multi-user MIMO systems, wherein each element of y will be assigned to an independent user terminal (UT), and therefore no cooperation will be possible between the UTs. In such a case, the precoding matrix P will suppress the inter-user interference; nevertheless the above technique may also be employed in a single-user MIMO system or a multi-user multi-antenna MIMO system, where one or more UTs have more than one receive antenna.

However, a drawback of precoding by means of the pseudoinverse channel matrix is that it can lead to an increase in transmitted power. This is addressed in "A vector-perturbation technique for near-capacity multiantenna multiuser communication—part II: perturbation," (B. M. Hochwald, C. B. Peel, and A. L. Swindlehurst, *IEEE Trans. on Commun.*, vol. 53, no. 3, pp. 537-544, March 2005) hereinafter referred to as "Hochwald et al.". Variations in transmitted power are undesirable, particularly as they may violate performance constraints for a device. They may also lead to increased power consumption, which is an important factor in the design of a handheld or otherwise portable communications device.

To illustrate problems faced and identified in the prior art, an example will now be given. In this example, u denotes the symbols, prior to precoding, to be transmitted. The vector is precoded by means of a precoding matrix P, which is chosen to be the Moore-Penrose pseudoinverse $P = H^+$, as $$s = Pu \tag{2}$$

The Moore-Penrose pseudoinverse is well known, but is particularly referenced in "On the reciprocal of the general algebraic matrix" (E. H. Moore; Bulletin of the American Mathematical Society 26: 394-395) and "A generalized inverse for matrices" (R. Penrose; Proceedings of the Cambridge Philosophical Society 51: 406-413).

Prior to transmission, the precoded signal s has to be scaled in order to fulfil the power restriction $\|x\|^2 = 1$, such that $$x = \frac{s}{\sqrt{\gamma}} \tag{3}$$

where $\gamma = \|s\|^2 = \|Pu\|^2$ as set out in "A vector-perturbation technique for near-capacity multiantenna multiuser communication—part I: channel inversion and regularization," (C. B. Peel, B. M. Hochwald, and A. L. Swindlehurst, *IEEE Trans. on Commun.*, vol. 53, no. 1, pp. 195-202, January, 2005), hereinafter referred to as "Peel et al.". This approach assumes perfect knowledge of $\gamma$ at the receiver side.

The normalisation factor is often very large because of the large singular values of the precoding matrix P, i.e., of the pseudoinverse of the channel matrix H (such as noted in papers by Hochwald et al. and by Peel et al., cited above). This can cause noise amplification at the receiver side since the receive symbol vector $y = \sqrt{\gamma} \times (Hx + n)$ is impaired by a scaled Gaussian noise vector $\sqrt{\gamma} n$.

Hochwald et al. suggests that one way of overcoming this noise amplification is to ensure that the transmitted data u does not lie along the singular values of $H^{-1}$ (or $H^+$, as the case may be). The idea is to allow u to be perturbed by a complex vector. The perturbed data vector is then:

$$\hat{u} = u - \tau l \tag{4}$$

where $\tau$ is a positive real number and l is a complex integer vector. The scalar $\tau$ is selected to be sufficiently large that the receiver may apply element-wise a modulo function to y $$\hat{u}_i = f_\tau(y_i) = y_i - \left\lfloor \frac{y_i + \tau/2}{\tau} \right\rfloor \tau \tag{5}$$

to obtain $\hat{u}$, where $\lfloor \ \rfloor$ rounds towards the nearest integer closest to zero. It will be noted that $f_\tau(y_i)$ is applied to real and imaginary parts separately. It should be recognised by the reader that $\hat{u}$ is not quantised and therefore contains additive noise.

Hochwald et al. also suggests that the constellation shift parameter $\tau$ should be $$\tau = 2\left(|c|_{max} + \frac{\Delta}{2}\right) \tag{6}$$

where $|c|_{max}$ is the absolute value of the real or imaginary part of the constellation symbol with greatest magnitude, and $\Delta$ is the smallest distance between two constellation symbols. It will be understood that the foregoing is set out for M-QAM constellations; non-square constellations such as PSK (Phase shift keying) or other, such as hexagonal constellations, may have a constellation shift parameter $\tau$ that is essentially the distance between the centres of repeated equidistantly shifted constellations.

FIG. 1 illustrates the modulo operation at the receiver side for a 16-QAM constellation. The received symbol, marked with an 'x', is shifted from the extended constellation (unfilled points) back to the original constellation (filled points), in which the symbol detection stage will be done. As will be appreciated by the reader, the average number of neighbouring points will be increased, as points of the original constellation which were previously considered to be at the edge of the constellation now have a complete set of neighbours. This has an impact on the error protection of the outer symbols. The shift parameter $\tau$, as the distance between the centres of the respective constellations, can lower this impact if it is chosen to be greater than defined in Equation 6.

In accordance with the above, $\tau$ and 1 can be selected in order to minimise $\gamma=\|s\|^2$, such that:

$$1 = \arg\min_{1'} \|P(u-\tau 1')\|^2 \qquad (7)$$

This is an integer least squares problem in the dimension of u, for the solution of which there exist a large number of algorithms. For instance, the reader is directed to "Closest point search in lattices" (E. Agrell, T. Eriksson, A. Vardy, and K. Zeger, *IEEE Transactions on Information Theory*, vol. 48, no. 8, pp. 2201-2214, August 2002) and to the references noted in Hochwald et al., especially the Fincke-Pohst algorithm, which is used for space-time demodulation in "Lattice code decoder for space-time codes," (M. O. Damen, A. Chkeif, and J.-C. Belfiore, *IEEE Commun. Letters*, vol. 4, pp. 161-163, May 2000), where it is called a sphere decoder. Because this algorithm can be used for encoding the data vector u, it is called a "sphere encoder".

If G is defined as the set:

$$G = \{a+ib\ a,b \in Z\}, \text{ with } i^2 = -1,$$

that is, the set of complex-valued integers, then an approximation of 1 can be calculated, and the perturbation vector is then given as $$1_{approx} = -TQ_{\tau G^K}\{T^{-1}u\},$$

where the quantisation function $Q_{\tau G^K}\{\cdot\}$ rounds the K-dimensional vector towards the nearest complex-valued point of the K-dimensional integer lattice, scaled with $\tau$(depicted by $\tau G^K$), where K is the number of spatial streams, i.e., the dimension of the vector u.

A practical implementation as an integer rounding function, indicated by G, can be $$1_{approx} = -TQ_{G^K}\left\{\frac{T^{-1}u}{\tau}\right\}. \qquad (8)$$

Due to the denominator $\tau$, the complex-integer-rounding function operates in a scaled integer lattice.

This is as set out in "Lattice-reduction-aided broadcast precoding," (C. Windpassinger, R. F. H. Fischer, and J. B. Huber, *IEEE Trans. on Commun.*, vol. 52, no. 12, pp. 2057-2060, December 2004—"Windpassinger et al.").

A number of lattice reduction algorithms exist. Any one of them can be used to calculate a transformation matrix, T, such that a reduced basis, $\hat{P}$, is given by PT. The matrix T contains only complex integer entries and its determinant is $|\det(T)|=1$ and thus is called a unimodular matrix.

The unimodular matrix T is given by means of a lattice reduction of the precoding matrix P with the LLL algorithm "Factoring Polynomials with Rational Coefficients" (A. Lenstra, H. Lenstra and L. Lovasz, *Math Ann.*, Vol. 261, pp. 515-534, 1982.), but any other algorithm for reducing a lattice basis is also applicable.

The normalisation factor $\gamma$ is then determined, by means of a closest point approximation, as:

$$\gamma = \|s\|^2 = \|P(u-\tau 1_{approx})\|^2 \qquad (9)$$

The complete transmission employing non-linear precoding can thus be formulated as $$y = \sqrt{\gamma}\left(H\left(\frac{P(u-\tau l)}{\sqrt{\gamma}}\right) + n\right) \qquad (10)$$

with y being the receive signal of a single user or a plurality of users, each receiving one or more elements $y_i$ of the vector y.

A block diagram of a transmission train employing data perturbation is shown in FIG. 2. As illustrated in FIG. 2, vector perturbation is carried out on the transmitted data u in a vector perturbation unit 20. The perturbed data is passed to be multiplied by the pseudo inverse $H^+$ in block 22, which is equivalent to equation 2 set out above. The next block 24 represents division by $\sqrt{\gamma}$, which is a normalisation step. The resultant vector x is re-multiplied by the channel matrix H (in block 26) as informed by channel information, to which is added a noise vector n. In block 28, the resultant vector y is re-multiplied by the square root of the normalisation factor $\gamma$ and then modulo $\tau$ is applied to arrive at the perturbed data vector û.

Finding the perturbation vector 1 can be done in several ways. For instance, the solution of $$1 = \arg\min_{1'} \|P(u-\tau 1')\|^2 \qquad (11)$$

is an integer least squares problem for which there exist a large number of solution methods, such as that disclosed in Agrell et al. and also as disclosed in references contained in Hochwald et al. Moreover, "On the expected complexity of integer least-squares problems," (B. Hassibi and H. Vikalo, Proc. *IEEE International Conference on Acoustics, Speech, and Signal Processing*, 2002 (ICASSP '02), vol. 2, pp. 1497-1500) describes complexity in the context of sphere decoding.

Further, approximation by means of lattice reduction is introduced in Windpassinger et al.

As FIG. 5 shows, there is a bit error rate performance gap of approximately 2 dB between the "optimal" solution of the least squares problem, denoted as "sphere encoding", and the approximation of 1 by means of lattice reduction, denoted as "LRA closest point algorithm". The reader will appreciate that FIG. 5 illustrates experimental results also for a specific embodiment of the invention, as will be described in due course.

SUMMARY OF THE INVENTION

Aspects of the invention employ lattice reduction but are intended to provide performance closer to an optimal solution.

Aspects of the invention provide a method which has the capability of improving on the performance of the vector perturbation non-linear preceding technique previously described in UK patent application GB2429884. This may involve generating a candidate list for vector perturbation precoding.

This may further involve providing a low complexity candidate list for peak-to-average power (PAPR) optimisation.

Aspects of the invention may provide a method of improving the approximation of a closest integer lattice point (and, in particular, closest point approximation).

Aspects of the invention may provide a method of improving the approximation of an integer least-squares problem.

An aspect of the invention provides a method of preceding information to be emitted on a multi-antenna emission, the method comprising applying a perturbation to said information before transmission, said perturbation being expressible as a perturbation vector, wherein said perturbation vector is selected by defining a lattice representing possible identities of information to be sent, defining a reduced lattice from said lattice, selecting a first candidate perturbation vector from said reduced lattice, selecting further candidate perturbation vectors, transforming said candidate perturbation vectors from expression in said reduced lattice into expression in said defined lattice and selecting one of said transformed candidate identities as perturbation to be applied, on the basis of a measure of power uniformity per antenna.

An aspect of the invention provides a precoder for multi-antenna wireless communications apparatus, the precoder comprising means for applying a perturbation to information before transmission, and offset determining means, the perturbation determining means being operable to determine a perturbation capable of being expressed as a vector in information lattice space, the perturbation determining means being operable to define a reduced lattice from said information lattice space, to select a first candidate perturbation vector from said reduced lattice, and to select further candidate perturbation vectors, then to transform said candidate perturbation vectors from expression in said reduced lattice into expression in said information lattice space and to select one of said transformed candidate identities as a perturbation to be applied, on the basis of a measure of power uniformity per antenna.

An aspect of the invention provides a computer program product comprising computer executable instructions which, when executed by a computer, cause the computer to perform a method as set out above. The computer program product may be embodied in a carrier medium, which may be a storage medium or a signal medium. A storage medium may include optical storage means, or magnetic storage means, or electronic storage means.

An aspect of the invention concerns precoding information prior to MIMO transmission is described, comprising determining a suitable precoding perturbation. The perturbation is determined by assembling a list of candidate perturbations in reduced lattice space, transforming these back into information lattice space and determining which candidate precoder perturbation is most suitable given a performance criterion.

The above aspects of the invention can be incorporated into a specific hardware device, a general purpose device configure by suitable software, or a combination of both. The invention can be embodied in a software product, either as a complete software implementation of the invention, or as an add-on component for modification or enhancement of existing software (such as, as a plug in). Such a software product could be embodied in a carrier medium, such as a storage medium (e.g. an optical disk or a mass storage memory such as a FLASH memory) or a signal medium (such as a download). Specific hardware devices suitable for the embodiment of the invention could include an application specific device such as an ASIC, an FPGA or a DSP, or other dedicated functional hardware means. The reader will understand that none of the foregoing discussion of embodiment of the invention in software or hardware limits future implementation of the invention on yet to be discovered or defined means of execution.

BRIEF DESCRIPTION OF THE DRAWINGS

Further aspects, features and advantages of the invention will become apparent from the following description of specific embodiments thereof, with reference to the accompanying drawings, in which.

DETAILED DESCRIPTION OF EMBODIMENTS

Figure 1:
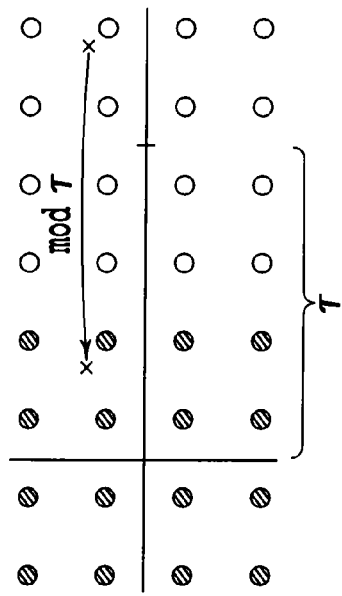
FIG. 1 illustrates a 16 QAM constellation having a modulo operation applied thereto.
Figure 2:
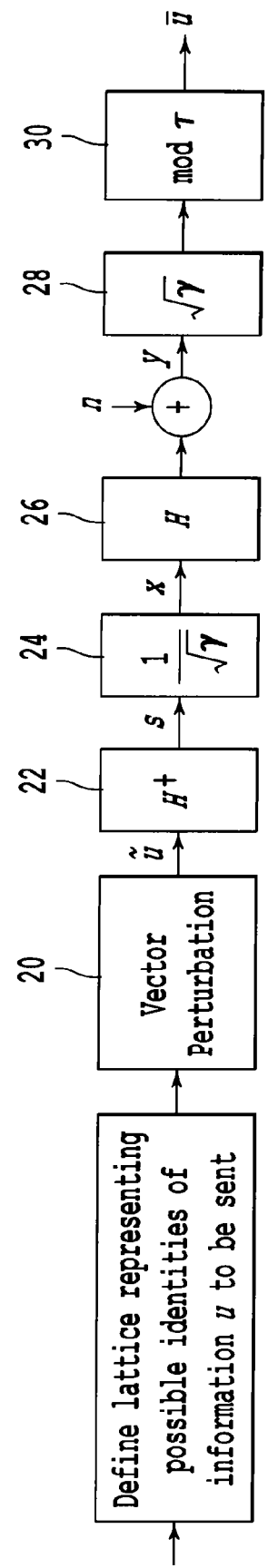
FIG. 2 illustrates a block diagram of a transmission train employing data perturbation.
Figure 3:
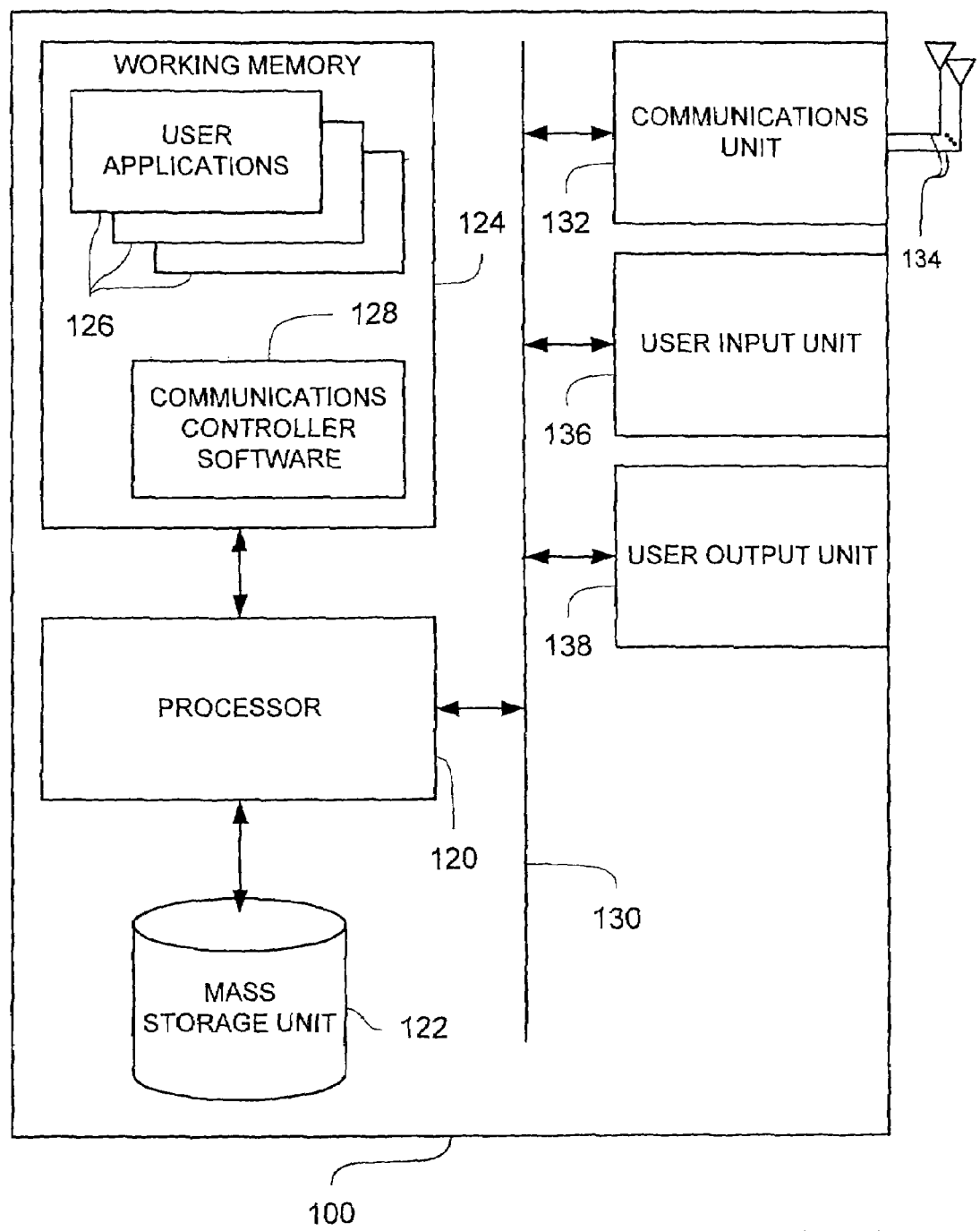
FIG. 3 illustrates an exemplary wireless communications device incorporating a specific embodiment of the invention.
Figure 4:
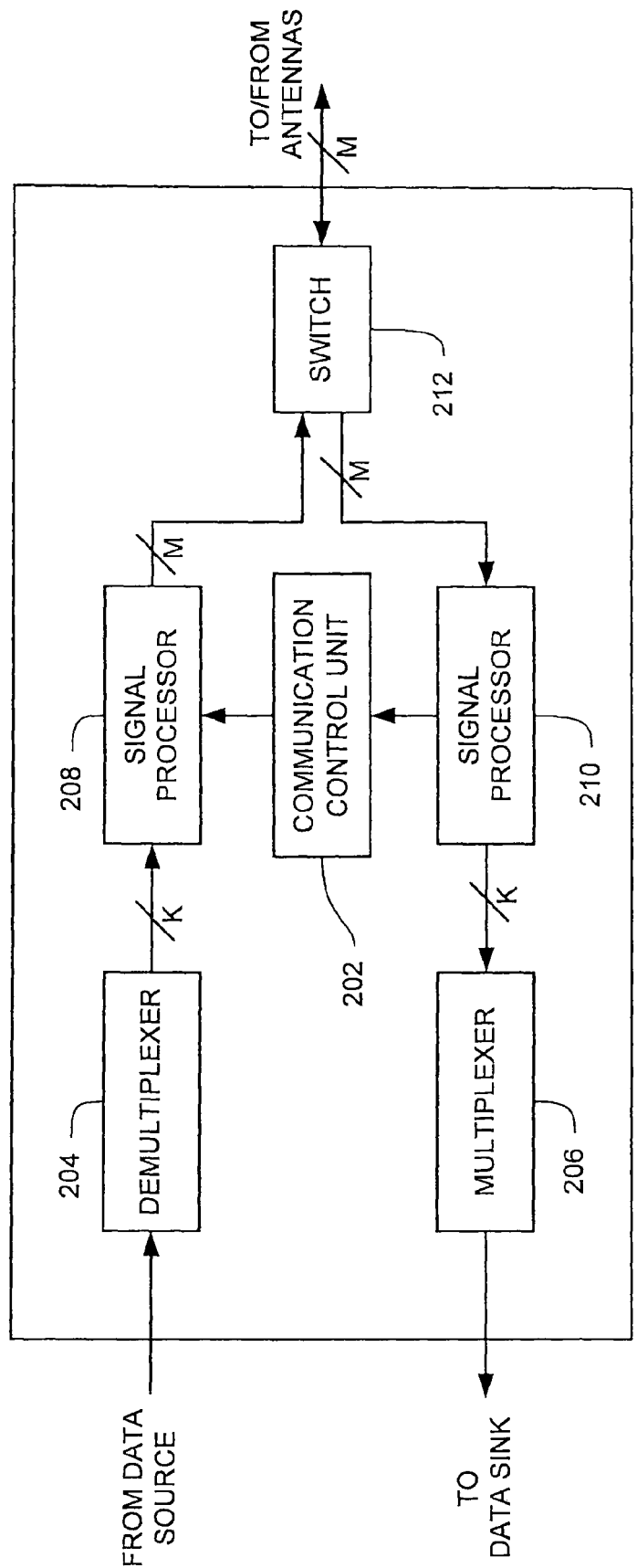
FIG. 4 illustrates a communications unit of the device illustrated in FIG. 3.

The present invention will now be described with reference to an implementation of a wireless communication device. FIG. 3 illustrates such a device 100.

The wireless communication device 100 illustrated in FIG. 3 is generally capable of being used in a MIMO context, to establish a MIMO communications channel with one or more other devices and, in accordance with a specific embodiment of the invention, to take account of channel information so as to derive a pre-coding scheme appropriate to the quality of the channel. The reader will appreciate that the actual implementation of the wireless communication device is non-specific, in that it could be a base station or a user terminal.

FIG. 3 illustrates schematically hardware operably configured (by means of software or application specific hardware components) as a wireless communication device 100. The receiver device 100 comprises a processor 120 operable to execute machine code instructions stored in a working memory 124 and/or retrievable from a mass storage device 122. By means of a general purpose bus 130, user operable input devices 136 are capable of communication with the processor 120. The user operable input devices 136 comprise, in this example, a keyboard and a mouse though it will be appreciated that any other input devices could also or alternatively be provided, such as another type of pointing device, a writing tablet, speech recognition means, or any other means by which a user input action can be interpreted and converted into data signals.

Audio/video output hardware devices 138 are further connected to the general purpose bus 130, for the output of information to a user. Audio/video output hardware devices 138 can include a visual display unit, a speaker or any other device capable of presenting information to a user.

Communications hardware devices 132, connected to the general purpose bus 130, are connected to antennas 134. In the illustrated embodiment in FIG. 3, the working memory 124 stores user applications 126 which, when executed by the processor 120, cause the establishment of a user interface to enable communication of data to and from a user. The applications in this embodiment establish general purpose or specific computer implemented utilities that might habitually be used by a user.

Communications facilities 128 in accordance with the specific embodiment are also stored in the working memory 124, for establishing a communications protocol to enable data generated in the execution of one of the applications 126 to be processed and then passed to the communications hardware devices 132 for transmission and communication with another communications device. It will be understood that the software defining the applications 126 and the communications facilities 128 may be partly stored in the working memory 124 and the mass storage device 122, for convenience. A memory manager could optionally be provided to enable this to be managed effectively, to take account of the possible different speeds of access to data stored in the working memory 124 and the mass storage device 122.

On execution by the processor 120 of processor executable instructions corresponding with the communications facilities 128, the processor 120 is operable to establish communication with another device in accordance with a recognised communications protocol.

Figure 7:
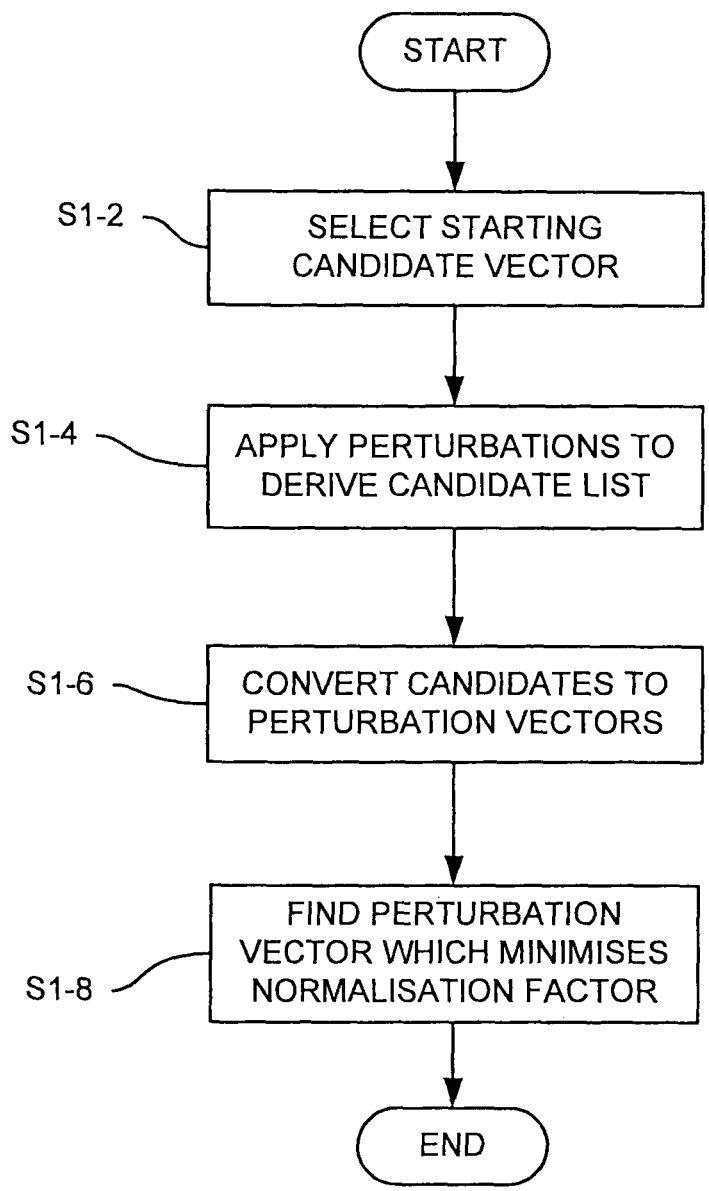
FIG. 7 illustrates a flow diagram of a precoding method in accordance with the specific embodiment of the invention.

The specific embodiment performs a method to improve the approximation of the perturbation vector generated by use of lattice-reduction-aided closest point approximation, in order to improve the performance of the system by finding a perturbation vector that results in a smaller normalisation factor $\gamma$. This is described with reference to the flow diagram illustrated in FIG. 7.

Equation 8 is the closest point approximation by means of lattice reduction, which is usually computed by the LLL algorithm. The closest point approximation itself is for example explained in Windpassinger et al. It will be recognised from FIG. 5 that the closest point approximation in Equation 8 still causes a performance gap compared with the optimal solution derived by means of an exhaustive search algorithm ("sphere encoding").

For this reason, the method employed by the specific embodiment of the invention finds and provides a candidate list L of possible perturbation vectors that are considered in order to minimise:

$$1 = \arg\min_{1' \in L} \|P(u - \tau 1')\|^2 \quad (12)$$

The first step (step S1-2) of the method of generating the candidate list takes place in the reduced lattice, where:

$$\hat{c} = T^{-1} 1_{approx} = T^{-1} T Q_{\tau G K} \{T^{-1} u\} = Q_{G K} \left\{ \frac{T^{-1} u}{\tau} \right\} \quad (13)$$

is the closest point approximation in the reduced lattice coordinates. This acts as the starting vector and first entry of the candidate list C. Other candidate vectors are then obtained by modifying one or more elements of the vector $\hat{c}$ and adding these as new candidate vectors to the list (step S1-4). $C^{(j)}$ is defined as the j-th candidate vector, and hence $C^{(1)} = \hat{c}$.

A simple and effective way (but not the only way) of generating a list of candidates is to perturb each element of $\hat{c}$ in turn by $\alpha \in \{1,-1,i,-i\}$, where $i^2 = -1$. For example, if $\hat{c}$ is a 2-by-1 vector, then there will be 8 additional candidate vectors, giving a total of 9 candidates as follows:

$$C^{(1)} = \hat{c} = \begin{bmatrix} \hat{c}_1 \\ \hat{c}_2 \end{bmatrix}$$

$$C^{(2)} = \begin{bmatrix} \hat{c}_1 + 1 \\ \hat{c}_2 \end{bmatrix}$$

-continued $$C^{(3)} = \begin{bmatrix} \hat{c}_1 - 1 \\ \hat{c}_2 \end{bmatrix}$$

$$C^{(4)} = \begin{bmatrix} \hat{c}_1 + i \\ \hat{c}_2 \end{bmatrix}$$

$$C^{(5)} = \begin{bmatrix} \hat{c}_1 - i \\ \hat{c}_2 \end{bmatrix}$$

$$C^{(6)} = \begin{bmatrix} \hat{c}_1 \\ \hat{c}_2 + 1 \end{bmatrix}$$

$$C^{(7)} = \begin{bmatrix} \hat{c}_1 \\ \hat{c}_2 - 1 \end{bmatrix}$$

$$C^{(8)} = \begin{bmatrix} \hat{c}_1 \\ \hat{c}_2 + i \end{bmatrix}$$

$$C^{(9)} = \begin{bmatrix} \hat{c}_1 \\ \hat{c}_2 - i \end{bmatrix}$$

The effect of perturbing elements of $\hat{c}$ is to generate other points in the reduced lattice. The perturbations by $\alpha$ give the closest points in the lattice, since $|\alpha|$ is the distance between any two neighbouring points.

An implementation may alternatively choose to increase the list of candidates though perturbing elements of $\hat{c}$ by multiples of $\alpha$ (i.e. not just to the closest point, but also to the closest few points), and/or by perturbing multiple elements of $\hat{c}$ simultaneously rather than just one element at a time.

Also a perturbation by $\alpha \in \{1,-1,i,-i,1+i,1-i,-1+i,-1-i\}$ can be considered, i.e. a complex perturbation.

It will be recognised that the technique disclosed in UK patent application GB2441376A can be used to generate a candidate list and maybe others without loss of generality.

Once a list C of candidate vectors in the reduced lattice has been obtained, each candidate can be converted to a perturbation vector (step S1-6). If the list of perturbation vector estimates is defined as $L^{(j)}$, then:

$$L^{(j)} = T C^{(j)} \quad (14)$$

where T is the lattice reduction transformation matrix obtained by, for example, the LLL algorithm.

The final step (S1-8) is to find the particular element $L^{(j)} \in L$ that minimises $\gamma$, which is:

$$1 = \arg\min_{1' \in L} \|P(u - \tau 1')\|^2 \quad (15)$$

The reader will see that this is the same as equation (12). The method described above looks to improve the closest point approximation of equation 8 by applying a candidate list L instead of $1_{approx}$ and replacing equation 8 with equation 12.

That means that if the closest-point-approximation was not the closest point, this candidate list could contain the closest point (or at least, a closer point) which would then be used as the perturbation vector.

Instead of a sphere encoder algorithm to solve the integer least-squares problem in equation 7, an improvement is made to the closest-point-approximation which achieves a very good performance when compared with the sphere encoding.

This technology improves the performance of non-linear precoding when lattice-reduction-aided vector perturbation is employed. The performance achieves a performance close to the optimum sphere encoding vector perturbation.

Furthermore the disclosed specific embodiment can be used to improve any integer least squares problem implementation, where the closest point is not necessarily required (to find the actual closest point on a guaranteed basis needs a sphere encoder), but rather an approximation will suffice (such as in precoding).

It may be beneficial to apply such an already computed candidate list to any kind of Peak-to-Average-Power-Ratio (PAPR) optimisations in OFDM systems. This application of the present invention can be described as follows.

An overview of the PAPR problem/optimisation in MIMO-OFDM systems can be found for instance in:

"Peak-to-average Power Ratio in High-Order OFDM," (N. Dinur, and D. Wulich, *IEEE Trans. on Commun.*, vol. 49, no. 6, pp. 1063-1072, June 2001); and "An overview of peak-to-average power ratio reduction techniques for OFDM systems," (L. Wang, and C. Tellambura, in *Proc. IEEE International Symposium on Signal Processing and Information Technology*, pp. 840-845, August 2006, Vancouver).

The specific embodiment as described herein uses an approach as described in "The p-sphere encoder: peak-power reduction by lattice precoding for the MIMO Gaussian broadcast channel," (F. Boccardi, and G. Caire, *IEEE Trans. on Commun.*, vol. 54, no. 11, November 2006). However, Boccardi et al. uses a sphere encoder to find the initial candidate minimising $\gamma$, i.e., the Euclidean norm $\|s\|^2$. The PAPR reduction needs to be done according to a different norm, $\mathcal{f}s\|_\infty^2$.

Boccardi et al. uses a modified sphere encoder to search within a sphere having the initial candidate (representing the optimal $\gamma$) as centre, and with a well-defined radius. The sphere encoder searches within this radius and finds perturbation vectors leading to a minimisation of $\|s\|_\infty^2$. The larger the well-defined radius, the better the PAPR reduction; but the worse may be the perturbation vector found according to the Euclidean norm, thereby leading to a worse $\gamma$.

Instead, the approach according to the present embodiment of the invention is to choose the centre as to be the best candidate found by the above described candidate list technique. This is likely to be very close to the optimum solution of the sphere encoder. A search is then carried out within the already generated list of candidates, L, in order to find a candidate being close to the initial candidate and minimising the PAPR.

It may be beneficial to increase the number of candidates in the list L.

The description in Boccardi et al. is for a complex baseband model, i.e., OFDM is not considered. "Peak to average power ratio reduction for MIMO-OFDM wireless system using nonlinear precoding," (J. Jiang, M. Buehrer, and W. H. Tranter, in *Proc. IEEE Global Telecommunications Conference* (*GLOBECOM*), vol. 6, pp. 3989-3993, 2004) describes how PAPR optimisation can be achieved for non-linear precoding in an OFDM system.

The main advantage of the present approach in this case is that the list of candidates is found by use of lattice reduction and subsequent list generation, which is less complex than sphere encoding.

Figure 5:
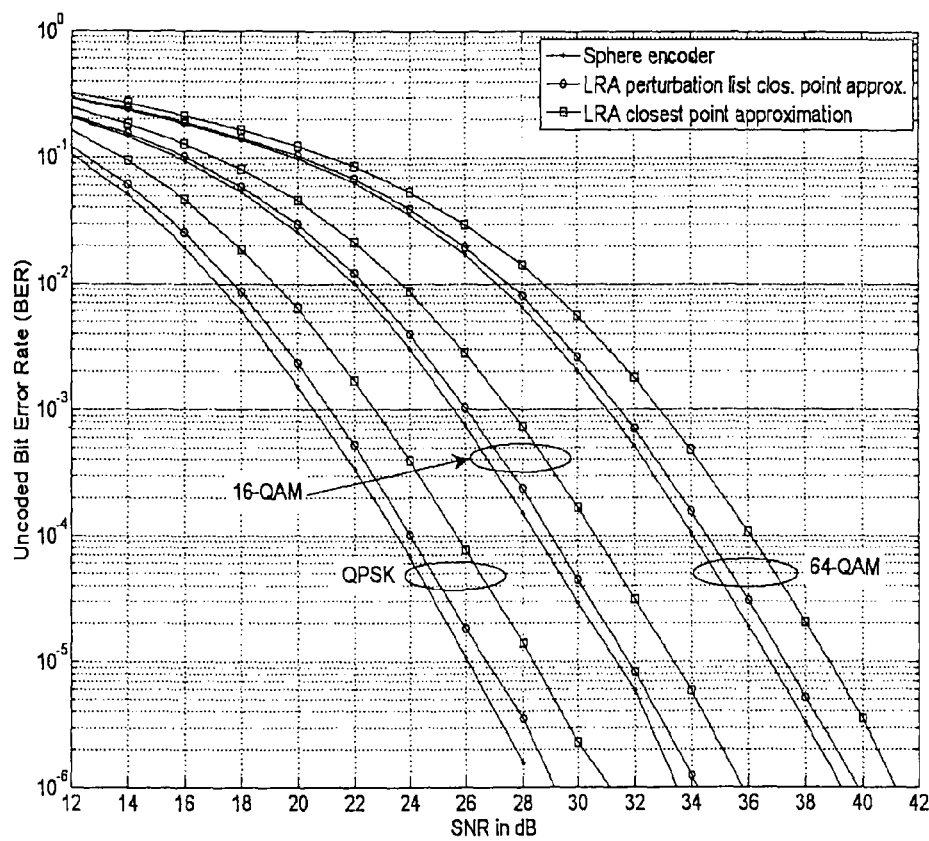
FIG. 5 illustrates a graph of performance of the communications unit of the specific embodiment in comparison with other prior art arrangements.

Experimental results, i.e., performance measurements in the sense of uncoded bit error rates, are shown in FIG. 5.

The simulations are carried out for a {2,2}×4 multi-user MIMO downlink scenario, i.e., there are two users with two receive antennas each, and the transmitter has four transmit antennas. Precoding is applied with the channel inverse, i.e., $P=H^{-1}$, and three different techniques were used to find the non-linear perturbation vector 1:

The first, labelled "Sphere encoder", is the optimal algorithm to minimise $\gamma$, the second, labelled "LRA closest point approximation", employs the lattice-reduction-aided closest point approximation as described in Windpassinger et al., and the third, labelled as "LRA perturbation list clos. point approx.", uses the method of the specific embodiment to provide a candidate list of possible approximations of the closest lattice point. The candidate list itself has been described above.

It will be appreciated that, in any one of the modulation schemes QPSK, 16-QAM and 64-QAM, there is a performance gap of more than 2 dB between the optimum sphere encoder and the LRA closest point approximation. There is also a gap of approx. 2 dB between the sphere encoding and LRA closest point approximation of Windpassinger et al.

The method set out above evidently closes this gap and achieves a gain of about 1.5 dB. This shows that the perturbation list may provide a better approximation of the closest lattice point than the original method as described in Windpassinger et al.

Figure 6:
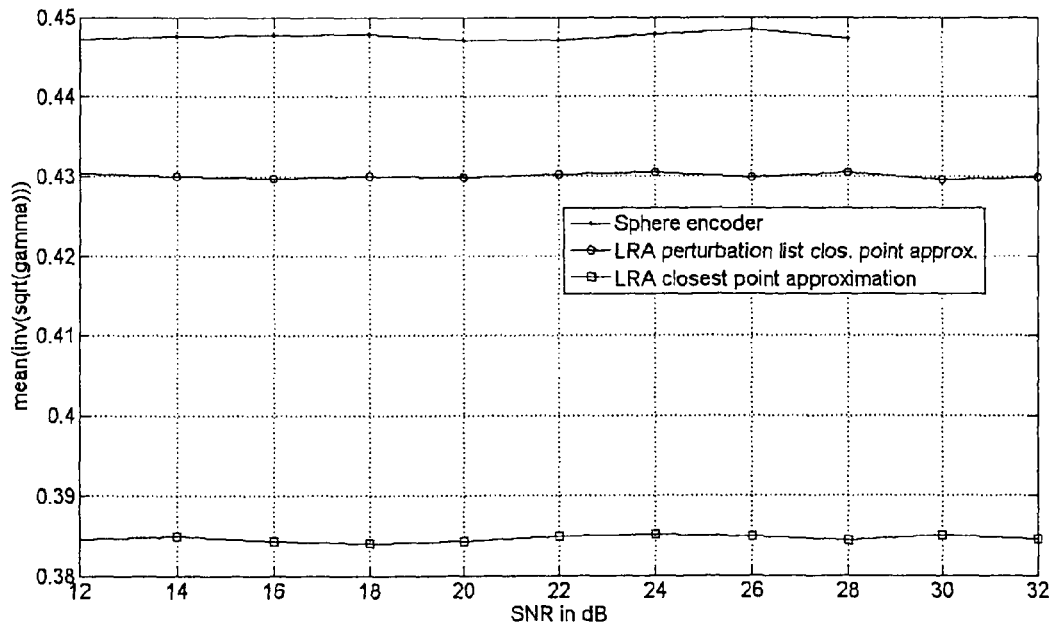
FIG. 6 illustrates further performance results of the specific embodiments of the invention as compared to said prior art examples.

In FIG. 6, the mean value of $$\frac{1}{\sqrt{\gamma}}$$

can be seen.

$$\frac{1}{\sqrt{\gamma}}$$

is the multiplier of the precoded signal. Therefore, since $\sqrt{\gamma}$ is desired to be as small as possible, $$\frac{1}{\sqrt{\gamma}}$$

should be as large as possible. Clearly, the normalisation factor achieved by the described embodiment provides improved results when compared with simulations involving the arrangement disclosed in Windpassinger et al.

It will be seen by the skilled reader that the method described in herein has, with the evidence of the experimental results, an advantageous effect on the normalisation factor.

While the foregoing specific description of an embodiment of the invention has been provided for the benefit of the skilled reader, it will be understood that it should not be read as mandating any restriction on the scope of the invention. The invention should be considered as characterised by the claims appended hereto, as interpreted with reference to, but not bound by, the supporting description.

The invention claimed is:

1. A method of processing information prior to emission thereof on a multi-antenna emission, comprising precoding said information and scaling said precoded information prior to emission thereof, the precoding comprising applying a perturbation to said information before transmission, said perturbation being expressible as a perturbation vector, wherein said perturbation vector is selected by defining a first lattice representing possible identities of information to be sent, defining a reduced lattice from said first lattice, selecting a first candidate perturbation vector from said reduced lattice, selecting further candidate perturbation vectors from said reduced lattice, transforming said candidate perturbation vectors from expression in said reduced lattice into expression in said first lattice to obtain transformed candidate identities, selecting one of said transformed candidate identities as perturbation to be applied, and said scaling comprising scaling said information after perturbation on the basis of a transmitted power constraint, wherein said selecting of one of said transformed candidate identities is performed on the basis of a scaling factor employed in said scaling.

2. The method in accordance with claim 1 wherein said selecting of said first candidate perturbation vector comprises applying a closest point approximation to the information to be transmitted, in the reduced lattice.

3. The method in accordance with claim 1 wherein said selecting of further perturbation vectors comprises applying one or more perturbations to at least one element of said first candidate vector.

4. The method in accordance with claim 3 wherein said one or more perturbations has magnitude of one inter-lattice point distance in said reduced lattice.

5. The method in accordance with claim 1 wherein said selecting one transformed canditate indentity comprises determining the transformed candidate identity which, when applied as a precoding offset to information to be transmitted, causes said precoded information to require the least scaling of said information prior to transmission.

6. A signal processing apparatus for processing information for a multi-antenna wireless communications apparatus, the signal processing apparatus comprising a precoder for precoding information to be emitted and scaling means for scaling said precoded information, wherein the precoder comprises perturbation application means for applying a perturbation to information before transmission, and offset determining means, the perturbation application means comprising perturbation means for determining a perturbation capable of being expressed as a vector in information lattice space, reduced lattice determining means for defining a reduced lattice from said information lattice space, vector selection means for selecting a first candidate perturbation vector from said reduced lattice, and for selecting further candidate perturbation vectors from said reduced lattice, vector transformation means for transforming said candidate perturbation vectors from expression in said reduced lattice into expression in said information lattice space as transformed candidate identities, and candidate selecting means for selecting one of said transformed candidate identities as perturbation to be applied, and wherein the scaling means is operable to scale said information after precoding on the basis of a transmitted power constraint, wherein said candidate selecting means is operable operable to select one of said transformed candidate identities on the basis of a scaling factor employed by said scaling means.

7. The apparatus in accordance with claim 6 wherein said vector selection means is operable to select said first candidate perturbation vector by applying a closest point approximation to the information to be transmitted, in the reduced lattice.

8. The apparatus in accordance with claim 6 wherein said vector selection means is operable to select said further perturbation vectors by applying one or more perturbations to at least one element of said first candidate vector.

9. The apparatus in accordance with claim 8 wherein said one or more perturbations has magnitude of one inter-lattice point distance in said reduced lattice.

10. The apparatus in accordance with claim 9 wherein said candidate selecting means is operable to determine the transformed candidate identity which, when applied as a precoding offset to information to be transmitted, causes said precoded information to require the least scaling of said information prior to transmission.

11. A wireless communications apparatus comprising a plurality of antennas and a signal processing apparatus in accordance with claim 6.

12. The apparatus in accordance with claim 6, wherein said precoder comprises a non-transitory computer readable medium storing computer executable instructions which, when executed by a computer, cause said computer to perform steps comprising:
   applying a perturbation to information before transmission,
   determining an offset,
   determining a perturbation capable of being expressed as a vector in information lattice space,
   defining a reduced lattice from said information lattice space,
   selecting a first candidate perturbation vector from said reduced lattice and selecting further candidate vectors from said reduced lattice,
   transforming said candidate perturbation vectors from expression in said reduced lattice into expression in said information lattice space as transformed candidate identities;
   and selecting one of said transformed candidate identities as perturbation to be applied.

13. A non-transitory computer readable medium storing computer executable instructions which, when executed by a computer, cause said computer to perform a method of processing information prior to emission thereof on a multi-antenna emission, comprising:
   precoding said information and scaling said precoded information prior to emission thereof, the precoding comprising applying a perturbation to said information before transmission, said perturbation being expressible as a perturbation vector, wherein said perturbation vector is selected by defining a first lattice representing possible identities of information to be sent, defining a reduced lattice from said first lattice, selecting a first candidate perturbation vector from said reduced lattice, selecting further candidate perturbation vectors from said reduced lattice, transforming said candidate perturbation vectors from expression in said reduced lattice into expression in said first lattice to obtain transformed candidate identities, selecting one of said transformed candidate identities as perturbation to be applied, and said scaling comprising scaling said information after perturbation on the basis of a transmitted power constraint, wherein said selecting of one of said transformed candidate identities is performed on the basis of a scaling factor employed in said scaling.

* * * * *